United States Patent [19]

Yasunaga et al.

[11] Patent Number: 4,948,626

[45] Date of Patent: Aug. 14, 1990

[54] METHOD FOR PRODUCING THIN-FILM MAGNETIC RECORDING MEDIUM

[75] Inventors: Tadashi Yasunaga; Koji Sasazawa; Akio Yanai, all of Kanagawa, Japan

[73] Assignee: Fuji Photo Film Co., Ltd., Kanagawa, Japan

[21] Appl. No.: 305,050

[22] Filed: Feb. 2, 1989

[30] Foreign Application Priority Data

Feb. 17, 1988 [JP] Japan ................................. 63-32800

[51] Int. Cl.$^5$ ........................................... H01F 10/02
[52] U.S. Cl. ....................................... 427/38; 427/42; 427/128; 427/129; 427/132; 427/251; 427/255.3; 427/296
[58] Field of Search ....................... 427/38, 40, 41, 42, 427/129, 44, 251, 128, 132, 205.3, 296; 428/900, 694

[56] References Cited

U.S. PATENT DOCUMENTS 4,450,186 5/1984 Shinohara .............................. 427/42

Primary Examiner—Bernard Pianalto

Attorney, Agent, or Firm—Sughrue, Mion, Zinn, Macpeak & Seas

[57] ABSTRACT

A method for producing a thin-film magnetic recording medium having an improved corrosion resistance and which permits production of the medium at a high speed. A magnetic material vapor flow from an evaporation source and a gas or ion flow are applied to a nonmagnetic base in an evaporation chamber and the two flows reacted with each other to form the thin-film magnetic layer on the nonmagnetic base. During this process, the expression $P_1/P_0 \leq 0.1$ is maintained, wherein $P_0$ represents the degree of vacuum in the evaporation chamber, under a first condition where only the gas or ion flow is applied after the pressure in the chamber has been reduced to a predetermined degree of vacuum, and $P_1$ represents the degree of vacuum in the chamber under a second condition where the magnetic material vapor flow is applied to the nonmagnetic base simultaneously with the gas or ion flow. The rate of formation of the thin-film magnetic layer is 200 Å/sec or more on the average.

8 Claims, 2 Drawing Sheets

METHOD FOR PRODUCING THIN-FILM MAGNETIC RECORDING MEDIUM

BACKGROUND OF THE INVENTION

The present invention relates to a method for producing a thin-film magnetic recording medium, and more particularly relates to a method for producing a thin-film magnetic recording medium having an excellent corrosion resistance.

Conventionally, to produce a widely used coating-type magnetic recording medium, a nonmagnetic base is coated with a powdered magnetic material dispersed in an organic binder such as a copolymer of vinyl chloride and vinyl acetate, a copolymer of styrene and butadiene, epoxy resin, polyurethane resin, or the like, and the coating is then dried. The powdered magnetic material is selected from oxide magnetic powder, for example, $\gamma\text{-}Fe_2O_3$, $Fe_2O_3$, Co-doped $\gamma\text{-}Fe_2O_3$, Co-doped $Fe_3O_4$, a bertholide composed of $\gamma\text{-}Fe_2O_3$ and $Fe_3O_4$, Co-doped bertholide, $CrO_2$, or the like, and alloy magnetic powder containing Fe, Co, Ni, etc., as principal components.

Recently, to obtain higher recording densities, a ferromagnetic thin film formed by vacuum evaporation, sputtering, ion plating, or the like, has received much attention as a so-called thin-film magnetic recording medium using no binder, and effort has been made to achieve practical applications of the ferromagnetic thin film.

The conventional coating-type magnetic recording medium, however, is unsuitable as a high-output high-density recording medium because it uses a metal oxide having a small saturation magnetization as its primary magnetic material, and the volume content of the magnetic material in the magnetic layer is only about 30 to 50%. Further, the conventional coating-type magnetic recording medium has a drawback in that it requires a complicated manufacturing process, which further requires large-scale incidental facilities for solvent recovery and pollution control. The metal thin-film magnetic recording medium, however, has an advantage in that ferromagnetic metal having saturation magnetization larger than that of oxide can be formed as an exceedingly thin film without using any nonmagnetic material such as an organic binder or the like. A recording/reproducing magnetic head having a gap length of 1.0 $\mu$m or less has been used to achieve higher density recording. With such a head, however, the recording depth in the magnetic recording layer is shallow, and therefore the entire thickness of the magnetic layer can be utilized for recording. As a result, this thin-film magnetic recording medium is extremely excellent for high-output high-density recording.

Of the available methods for producing a thin-film magnetic recording medium, methods using vacuum evaporation for film formation have the advantages that the film forming speed is high, the film-formation process is simple, the drying process does not require waste liquid disposal, etc. Of the evaporation methods, the oblique-incidence vacuum evaporation method in which a vapor flow of a magnetic material is made to be obliquely incident on a nonmagnetic base is superior in practical use because the method is relatively simple to implement and at the same time a film having excellent magnetic characteristics can be obtained.

The thin-film magnetic recording medium, however, has a drawback in that characteristics for practical use such as corrosion resistance, durability, and the like, are inferior to those of the above-discussed coating-type magnetic recording medium. There have been proposed various methods for eliminating this drawback. In one of those methods, a gas is fed into a vacuum tank while a magnetic material is evaporated in the vacuum tank so that the gas and the magnetic material are caused to react with each other to form a thin-film magnetic layer. (See Japanese Unexamined Pat. Publications Nos. 58-41442 and 58-41443.) For example, compared with the case where film formation is performed without supplying any reactive gas into the vacuum tank, the durability and corrosion resistance are exceedingly improved in the case where an alloy of Co (80%) and Ni (20%) is used as the magnetic material and film formation is performed while oxygen gas is supplied into the vacuum tank. Further, the present applicants have proposed a way of improving the corrosion resistance by supplying oxygen gas into the vacuum tank. (See Japanese Unexamined Pat. Publication No. 62-121929.) Moreover, for a combination of gases which cannot be made to react only by supplying a gas into a vacuum tank, the problem can be solved by ionizing and exciting the gas so as to make its reaction activity high. To this end, for example, there has been proposed a method in which Fe is used as a magnetic material and nitrogen gas, which is a reactive gas, is ionized to thereby form an iron nitride magnetic layer. (See Japanese Unexamined Pat. Publication No. 60-231924.)

In the foregoing method, although considerable improvements are achieved over the conventional approach, the corrosion resistance of the obtained thin-film magnetic layer has sometimes been insufficient when the formation of the thin-film magnetic layer is performed at a high speed of 200 Å/sec or more.

SUMMARY OF THE INVENTION

As a result of various investigations on the foregoing problems, the applicants have found that the corrosion resistance can be remarkably improved by establishing the degree of vacuum in the evaporation chamber in performing reactive evaporation within a specific range.

That is, according to the present invention, a method is provided for producing a thin-film magnetic recording medium in which a magnetic material vapor flow from an evaporation source and a gas flow or an ion flow are applied to a nonmagnetic base in an evaporation chamber, and these flows react with each other to form a thin-film magnetic layer on the nonmagnetic base wherein the expression $$P_1/P_0 \leq 0.1$$

is satisfied by establishing a degree of vacuum $P_0$ (Torr) in the evaporation chamber in a first condition where, after the pressure in the evaporation chamber has been reduced to a predetermined degree of vacuum, only the gas flow or the ion flow is applied to the magnetic base, and, after the first condition has been established, degree of vacuum $P_1$ (Torr) in the evaporation chamber in a second condition where the magnetic material vapor flow is applied to the nonmagnetic base while the gas flow or the ion flow is continued to be applied to the nonmagnetic base, and wherein the rate of forming the thin-film magnetic layer is 200 Å/sec or more on the average.

It is preferable that the rate of film formation of the thin-film magnetic layer be 200 Å/sec or more. Further, in order to obtain magnetic characteristics required for a magnetic recording medium, it is preferable that the magnetic material flow be applied obliquely to the nonmagnetic base. The incident angle of the magnetic material flow is selected to be 20° or more, preferably, 35° or more.

For the thin-film magnetic layer, it is preferable to select its material from iron nitrides or iron nitride oxides.

For the nonmagnetic base to be used in the practice of the present invention, it is desirable to use a plastic base, for example, a base of polyethylene terephthalate, polyimide, polyvinyl chloride, cellulose triacetate, polycarbonate, or the like.

DESCRIPTION OF THE PREFERRED EMBODIMENTS

The present invention will be described in more detail hereunder with reference to the accompanying drawings.

Figure 1:
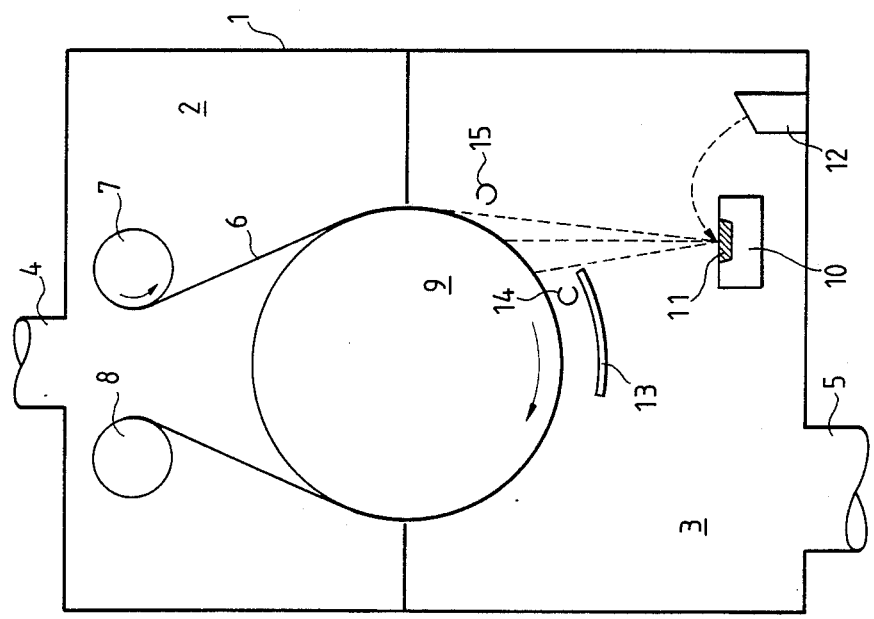
FIG. 1 shows an apparatus for realizing a method according to the present invention for producing a thin-film magnetic recording medium.

FIG. 1 shows a production apparatus for realizing the method for producing a thin-film magnetic recording medium according to the present invention. A vacuum tank 1 is divided into an upper chamber 2 and a lower or evaporation chamber 3. After being fed from a feed roll 7 and conveyed along a cooling drum 9, a nonmagnetic base 6 is taken up on a take-up roll 8. In this process, a magnetic layer is formed through evaporation in the evaporation chamber 3.

Specifically, a magnetic material 11 is heated with electron beams so as to evaporate it to create a vapor flow, and the vapor flow is directed toward the nonmagnetic base 6. The incident angle of the vapor flow onto the nonmagnetic base is restricted by a mask 13 so as to establish the desired oblique incidence of the vapor flow. Evaporation is performed while a gas is supplied into the evaporation chamber from gas supply openings 14 and 15 simultaneously with the oblique incidence of the vapor flow, as a result of which a magnetic film generated through reaction is formed on the base 6.

When a film is formed along the surface of a cylindrical drum as described above, it is difficult to define the rate of film formation because the rate of film accumulation may vary depending on the location on the circumference of the drum. However, it is possible to establish the rate of film formation so as to be, for example, 1000 Å/sec when a portion of the circumference of the drum on which film formation is to be carried out is exposed to a vapor flow for one second to thereby result in a film of 1000 Å in thickness at that portion.

In FIG. 1, the magnetic material 11 is evaporated while a gas is supplied into the evaporation chamber through the gas supply openings 14 and 15. At this time, it is necessary that the condition of $P_1/P_0 \leq 0.1$ be satisfied, where $P_0$ (Torr) represents the degree of vacuum in the evaporation chamber when only the gas is supplied into the evaporation chamber and $P_1$ (Torr) represents the degree of vacuum in the evaporation chamber when the evaporation of the magnetic material 11 is performed simultaneously with the supply of gas.

Although the above conditions required by the present invention are obtained by the provision of two gas supply openings in FIG. 1, it is a matter of course that the present invention can be realized by the provision of only one gas supply opening. If a gas is fed into the evaporation chamber, for example, only through the gas supply opening 14 so as to satisfy the conditions of the present invention, however, the surface of the nonmagnetic layer of the medium becomes so thick that the medium is unsuitable for high-density recording.

Figure 2:
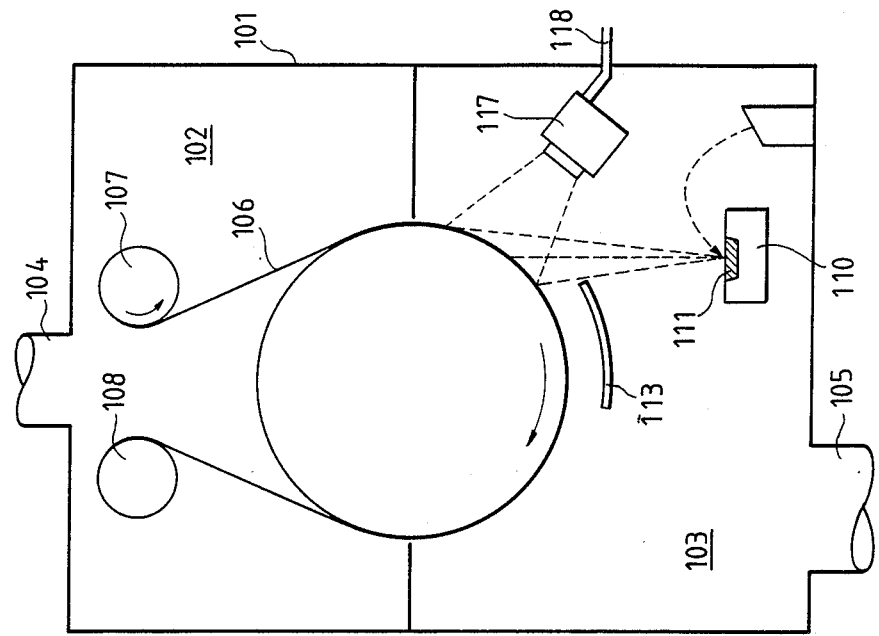
FIG. 2 shows another apparatus for realizing the method according to the present invention in which an ion flow is provided.

FIG. 2 shows another production apparatus for realizing the method for producing a thin-film magnetic recording medium according to the present invention. The operations of the base conveying system and the like are essentially the same as those of FIG. 1, and elements shown in FIG. 2 corresponding to those of FIG. 1 are represented by reference numerals obtained by adding 100 to those of FIG. 1.

In the embodiment of FIG. 2, a gas is fed into an evaporation chamber 103 through a gas supply opening 118, while a magnetic material 111 is evaporated in the evaporation chamber 103 and the gas is ionized and radicalized by an ion gun 117. The thus-obtained ion flow is fed toward the area where the film is to be formed. In this case, according the present invention, the condition of $P_1/P_0 \leq 0.1$ is satisfied, where $P_0$ (Torr) represents the degree of vacuum in the evaporation chamber when only the gas is fed into the evaporation chamber through the gas supply opening 118 and $P_1$ (Torr) represents the degree of vacuum in the evaporation chamber when the evaporation of the magnetic material 11 is performed simultaneously with the supply of the gas.

The reason why the value $P_1$ is smaller than the value of $P_0$ is that the vapor of the magnetic material reacts with the gas flow or the ion flow to thereby reduce the molecular density in the vacuum tank.

Next, the present invention will be described more specifically with respect to examples. The present invention however, is not limited to those examples.

EXAMPLE 1

An evaporation magnetic thin film composed of Co-Ni (Ni= 20 atm%) was formed on a polyethylene terephthalate film having a thickness of 7.0 μm through the above-described evaporation method with the use of a take-up vacuum evaporation apparatus as illustrated in FIG. 1 to thereby produce a master roll of magnetic tape. The film width was 100 mm, and the incident angle of vapor flow limited by the mask 13 was 35°. Evaporation was performed while oxygen gas was supplied into the evaporation chamber through the gas supply openings 14 and 15.

The film conveying speed was varied within a range of 2 m/min to 25 m/min under the condition that the thickness of the magnetic thin film was fixed at 2000 Å. The rate of film formation on the average was as follows:

2 m/min : 80 Å/sec
5 m/min : 200 Å/sec
25 m/min : 1000 Å/sec

The gas supply opening 14 was provided at a position where the incident angle was at a minimum value of 35°, and the gas supply opening 15 was provided at a position where the incident angle was 80°.

Under these conditions, various tests 1-10 were made as shown in Table 1. In each test, first, the evaporation chamber was exhausted so that the degree of vacuum in the evaporation chamber was $1 \times 10^{-5}$ Torr or less. Then, oxygen gas was fed into the evaporation chamber through the gas supply opening 14 at a rate such that the degree of vacuum in the evaporation chamber became $1 \times 10^4$ Torr. Further, additional oxygen gas was fed into the evaporation chamber through the gas supply opening 15 so that the degree of vacuum in the evaporation chamber became a predetermined value as shown in Table 1. The predetermined value of the degree of vacuum in the evaporation chamber is represented by $P_0$ (Torr). Next, while oxygen gas was fed at a predetermined rate into the evaporation chamber so that the degree of vacuum in the evaporation chamber was maintained at the value $P_0$, the magnetic material 11 was heated by electron beams so as to be fused so that a magnetic thin film was formed on the base film 6 by reactive evaporation at a predetermined rate of film formation as also shown in Table 1. The degree of vacuum during the film formation was held at a predetermined value $P_1$ (Torr) as shown in Table 1.

A central portion of each of the thus-obtained master rolls of magnetic tape was sampled, and the magnetic characteristics and corrosion resistance were measured on the sampled portion. The values of the magnetic characteristics were obtained with a VSM. The corrosion resistance was evaluated in accordance with the rate of change of magnetic flux before and after the sample was left in an atmosphere of 60° C. and 90%RH for 14 days.

Table 1 shows the results of these measurements. For practical use, it is necessary that Hc be 850 Oe or more and the demagnetizing factor (the rate of change of magnetic flux) be about 5% or less.

As seen from Table 1, when oxygen gas is fed into the evaporation chamber, when the quantity of the oxygen gas was so small that the value $P_0$ was $1.0 \times 10^{-4}$ Torr or $7.0 \times 10^{-4}$ Torr, the quantity of reaction was too small to make the ratio of $P_1/P_0$ be 0.1 or less, and if the quantity of the oxygen gas is so large that the value $P_0$ is made to be $4.0 \times 10^{-3}$ Torr, on the contrary, excessive oxygen gas may exist relative to the vapor for causing a reaction. This occurred, for example, in the case of Test No. 3 where the rate of film formation was 80 Å/sec. In this case, it is impossible to make the ratio $P_1/P_0$ be 0.1 or less, similarly to the first-mentioned case.

TABLE 1

| Test No. | Å/sec | $P_0$ (Torr) | $P_1$ (Torr) | $P_1/P_0$ | Hc (Oe) | Corrosion Resistance (Demagnetizing factor %) |
|---|---|---|---|---|---|---|
| 1 | 80 | $1.0 \times 10^{-4}$ | $8.8 \times 10^{-5}$ | 0.88 | 770 | 18 |
| 2 | 80 | $7.0 \times 10^{-4}$ | $5.2 \times 10^{-4}$ | 0.74 | 680 | 17 |
| 3 | 80 | $4.0 \times 10^{-3}$ | $1.5 \times 10^{-3}$ | 0.37 | 600 | 20 |
| 4 | 200 | $1.0 \times 10^{-4}$ | $7.5 \times 10^{-5}$ | 0.75 | 880 | 13 |
| 5 | 200 | $7.0 \times 10^{-4}$ | $2.8 \times 10^{-4}$ | 0.40 | 950 | 10 |
| 6 | 200 | $4.0 \times 10^{-3}$ | $3.8 \times 10^{-4}$ | 0.09 | 1050 | 5 |
| 7 | 1000 | $1.0 \times 10^{-4}$ | $6.0 \times 10^{-5}$ | 0.60 | 900 | 11 |
| 8 | 1000 | $7.0 \times 10^{-4}$ | $1.2 \times 10^{-4}$ | 0.17 | 1100 | 9 |
| 9 | 1000 | $4.0 \times 10^{-3}$ | $2.2 \times 10^{-4}$ | 0.05 | 1220 | 4 |
| 10 | 1000 | $1.0 \times 10^{-2}$ | $7.7 \times 10^{-4}$ | 0.07 | 1250 | 3 |

EXAMPLE 2

A magnetic recording medium having an iron nitride magnetic film was produced using the apparatus of FIG. 2. The production conditions were as follows:
Base: 13 μm thick polyethylene terephthalate
Incident angle: 75°
Evaporation material: 99.9% purity Fe thermally evaporated with election beams
Rate of evaporation: measured by means of a crystal oscillation film thickness monitor
Ion gun: lead-in industrial nitrogen gas
Ion energy: 1.0 KeV
Aperture size (rectangular): 60 mm × 200 mm
Ion current value: 500 mA (The value may fluctuate by about 20% depending on the quantity of the fed gas.)
The production procedure was as follows:
The rate of film formation was determined to be as follows in the same manner as in Example 1:
80 Å/sec, 200 Å/sec. and 500 Å/sec.

Under these conditions, various tests 11-20 as shown in Table 2 were conducted. In each test, nitrogen gas was fed into the ion gun 117 at a rate so as to make the degree of vacuum in the evaporation chamber assume a predetermined value. The ion gun was operated under this condition to thereby control the nitrogen ion flow. The degree of vacuum at this time was $P_0$ (Torr). Next, the magnetic material was thermally fused with electron beams while a predetermined quantity of nitrogen gas was fed into the evaporation chamber at such a rate as to make the degree of vacuum be $P_0$. Thus, a magnetic thin film was formed on the base film through reactive evaporation. At this time, the degree of vacuum was held at the predetermined value $P_1$ (Torr) shown in Table 2.

A central portion of each of the thus-obtained master rolls of magnetic tape was sampled, and the magnetic characteristics and corrosion resistance were measured on the sampled portion.

The value of the magnetic characteristics was obtained with a VSM. To measure the corrosion resistance, the sample was sprayed with a 5% NaCl aqueous solution for 5 minutes, the sample was left in an atmosphere of 60° C. and 90% RH for three days, and then the state of generation of corrosion was observed and rated. Of the marks shown in Table 2, "4" and "5" are passing levels for practical use.
5: no corrosion was generated
4: generation of corrosion could be seen through a microscope
3: generation of corrosion could be seen with the naked eye
2: generation of corrosion was remarkable
1: magnetic layer was fused

TABLE 2

| Test No. | Å/sec | $P_0$ (Torr) | $P_1$ (Torr) | $P_1/P_0$ | Hc (Oe) | Corrosion Resistance (Rating) |
|---|---|---|---|---|---|---|
| 11 | 80 | $1.0 \times 10^{-4}$ | $8.6 \times 10^{-5}$ | 0.86 | 660 | 2 |
| 12 | 80 | $7.0 \times 10^{-4}$ | $5.3 \times 10_{-4}$ | 0.75 | 880 | 4 |
| 13 | 80 | $4.0 \times 10^{-3}$ | $1.0 \times 10^{-3}$ | 0.25 | 860 | 4 |
| 14 | 200 | $1.0 \times 10^{-4}$ | $8.0 \times 10^{-5}$ | 0.80 | 700 | 2 |
| 15 | 200 | $7.0 \times 10^{-4}$ | $4.5 \times 10^{-4}$ | 0.64 | 770 | 3 |
| 16 | 200 | $4.0 \times 10^{-3}$ | $3.6 \times 10^{-4}$ | 0.09 | 1075 | 5 |
| 17 | 500 | $1.0 \times 10^{-4}$ | $7.6 \times 10^{-5}$ | 0.76 | 630 | 1 |
| 18 | 500 | $7.0 \times 10^{-4}$ | $1.6 \times 10^{-4}$ | 0.22 | 1000 | 3 |
| 19 | 500 | $4.0 \times 10^{-3}$ | $2.1 \times 10^{-4}$ | 0.05 | 1150 | 5 |
| 20 | 500 | $1.0 \times 10^{-2}$ | $5.8 \times 10^{-4}$ | 0.05 | 1260 | 5 |

According to the present invention, a magnetic recording medium having an excellent corrosion resistance and magnetic characteristics can be obtained at a high rate of film formation of 200 Å or more. Accordingly, the method of the present invention is excellent for producing a magnetic recording medium suitable for high-density recording.

What is claimed is:

1. In a method for producing a thin-film magnetic recording medium in which a magnetic material vapor flow evaporated from an evaporation source and a gas flow or an ion flow are applied to a nonmagnetic base in an evaporation chamber and those two flows react with each other to form a thin-film magnetic layer on said nonmagnetic base, the improvement wherein the expression $$P_1/P_0 \leqq 0.1$$

is satisfied, wherein $P_0$ represents a degree of vacuum in said evaporation chamber in a first condition where only said gas flow or said ion flow is applied to said nonmagnetic base after the pressure in said evaporation chamber has been reduced to a predetermined degree of vacuum and $P_1$ represents a degree of vacuum in said evaporation chamber in a second condition where said magnetic material vapor flow is applied to said nonmagnetic base while said gas flow or said ion flow continues to be applied to said nonmagnetic base after said first condition has been established, and wherein a rate of forming said thin-film magnetic layer is 200 Å/sec or more on average.

2. The method for producing a thin-film magnetic recording medium of claim 1, wherein an incident angle of said vapor flow onto said nonmagnetic base is restricted by a mask to establish an oblique angle of incidence of said vapor flow onto said nonmagnetic base.

3. The method for producing a thin-film magnetic recording medium of claim 1, wherein an incident angle of said vapor flow onto said nonmagnetic base is at least 20°.

4. The method for producing a thin-film magnetic recording medium of claim 1, wherein an incident angle of said vapor flow onto said nonmagnetic base is at least 35°.

5. The method for producing a thin-film magnetic recording medium of claim 1, wherein said vapor flow is created by heating a source of material with electron beams.

6. The method for producing a thin-film magnetic recording medium of claim 1, wherein said gas or ion flow comprises a gas flow supplied into said evaporation chamber through two spaced gas supply openings.

7. The method for producing a thin-film magnetic recording of claim 1, wherein said gas flow or ion flow comprises an ion flow generated by an ion gun.

8. The method for producing a thin-film magnetic recording medium of claim 1, wherein said nonmagnetic base is made of a material selected from the group consisting of polyethylene terephthalate, polyimide, polyvinyl chloride, cellulose triacetate and polycarbonate.

* * * * *